May 26, 1925.
J. E. MAPLES
1,538,997
AIR GAUGE AND AUTOMATIC SIGNAL FOR PNEUMATIC TIRE FILLERS
Filed May 26, 1923
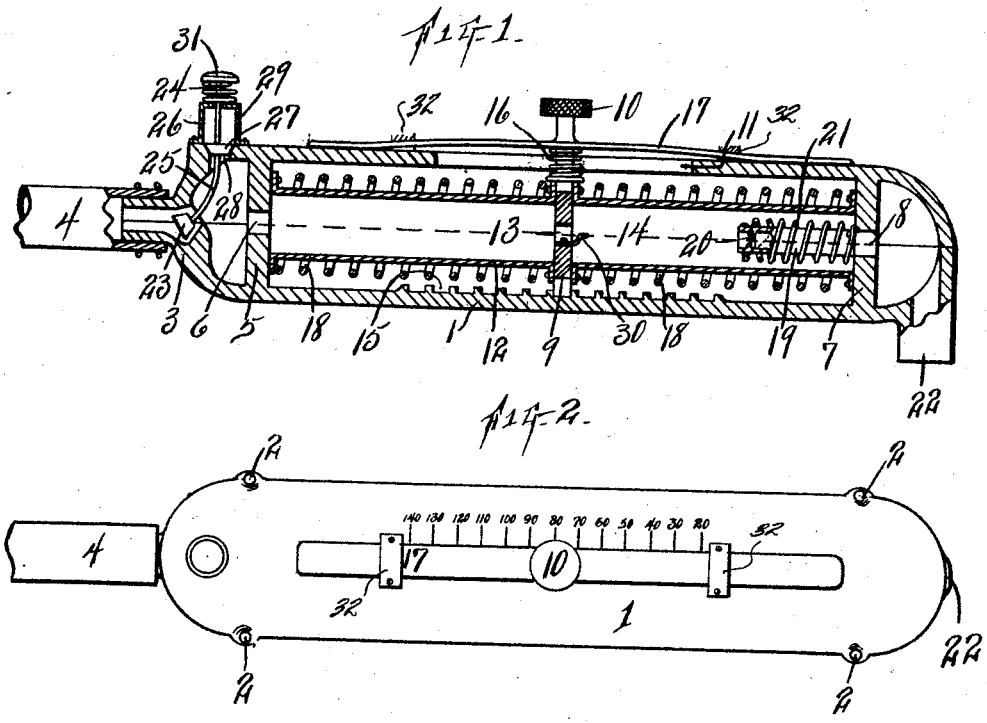
Inventor
JONAS E. MAPLES.
By A. L. Jackson
Attorney Patented May 26, 1925.

1,538,997

UNITED STATES PATENT OFFICE.

JONAS E. MAPLES, OF FORT WORTH, TEXAS.

AIR GAUGE AND AUTOMATIC SIGNAL FOR PNEUMATIC TIRE FILLERS.

Application filed May 26, 1923. Serial No. 641,568.

*To all whom it may concern:*

Be it known that I, JONAS E. MAPLES, a citizen of the United States, residing at Fort Worth, in the county of Tarrant and State of Texas, have invented certain new and useful Improvements in Air Gauges and Automatic Signals for Pneumatic Tire Fillers, of which the following is a specification.

My invention relates to air gauges and automatic signaling devices for use in filling pneumatic tires; and the object is to provide a combination gauge and filling device to take the place of the testing devices and separate filling devices heretofore used so that the tires can be filled and tested all in one operation and also to provide the filling devices with an automatic signal which will indicate that the required pressure has been obtained for the tires. Other objects and advantages will be fully explained in the following description and the invention will be more particularly pointed out in the claims.

Reference is had to the accompanying drawings which form a part of this application.

Fig. 1 is a longitudinal section of the casing and rubber tubes and showing the operating parts applied. Fig. 2 is a plan view of the same.

Similar characters of reference are used to indicate the same parts throughout the several views.

The device is provided with a casing 1 which may be made in two parts and bolted together with bolts 2. The end 3 is swaged and reduced to form a connection for a filling hose 4. A partition 5 is formed transversely in the casing 1 and provided with an air passage 6. A partition 7 is formed transversely in the casing 1 and provided with an air passage 8. A gauge 9 is movable longitudinally in the casing and is provided with a handle 10 which projects through a longitudinal slot 11 in the casing 1. A rubber tube 12 is attached to the partition 5 and to the gauge 9, the gauge 9 being provided with an air passage 13. A rubber tube 14 is attached to the partition 7 and to the gauge 9. A rack 15 is provided in the casing 1 and this rack is provided with a plurality of spaces or depressions each adapted to receive the end of the gauge 9 and to hold the gauge against longitudinal movement in the casing. A spring 16 is mounted on the gauge on the opposite side from the rack 15 and tends to press the gauge down against the rack so that the gauge will be held in whatever depression it is placed. A spring 17 extends longitudinally of the casing 1 and keeps the slot 11 closed and is held in place by cleats 32. The rubber tubes 12 and 14 are provided with spiral springs 18 which surround the tubes and provide protection or re-inforcing for the tubes and permit freedom of movement of the gauge 9 which may be moved in either direction. The tubes 12 and 14 are elastic so that the gauge 9 may be set in the depression in the rack 15 opposite the number which indicates the required pressure. The device is provided with a testing tube 19 of rubber and this tube 19 is attached to the partition 7 inside of the tube 14 and is provided with a valve 20. The tube 19 is also provided with a spring 21 for the protection of the tube and which permits freedom of movement of the tube 19 which is elastic. The casing 1 is provided with a nozzle 22 which is the filling nozzle and of the usual type for pressing the valve open when a tire is to be filled. The casing has an appropriate scale at one side of the spring 17 for guidance in setting the gauge 9 to obtain the required pressure.

The tube 19 may be used as a testing device as well as a passageway for the air to pass through the opening 8.

The casing 1 is provided with a valve 23 which is held normally closed by a spring 24. The valve 23 is mounted on a stem 25 which extends out of the casing 1 and through a cage 26. A valve 27 is mounted on the stem 23 and is used to close the outlet passage 28. The valve 23 is shown open for inward passage of air. The cage 26 is provided with an opening 29. The gauge 9 carries a finger or pointer 30 for opening the valve 20.

To use the device for testing the pressure in a tire, place the nozzle 22 on the tire valve and press it open. Then move the gauge 9 until the finger 30 opens the valve 20. The gauge 9 will then be near a number on the scale and this will indicate the pressure and the air, rushing through the tube 19, will pass through the valve 27 which is normally open and the opening 29 will let the air out and serve as a whistle which will be sounded by the emission of the air. The whistle and the gauge 9 cooperate in testing the air pressure in the tire.

To use the device for filling the tires. The device is permanently attached to the hose line 4 of the air supply. Place the nozzle 22 on the tire valve and press it open as usual. Then press on the button 31 and open valve 23 and close valve 27. Air will rush through the device into the tire. The gauge 9 is first set at the number on the scale which indicates the pressure wanted. The amount of air pressure in the tire can be tested by removing the pressure from button 31. If the required pressure has been obtained, the tube 19 will be stretched by back pressure of the air until the valve 20 strikes the finger 30 and this will open the valve 20 and let air pass through the device and automatically press the valve 27 open and sound the whistle. If the whistle does not sound, this indicates that the required pressure has not been obtained, there being not enough back pressure to force the valve 20 against the finger 30. Then press on the button 31 and let the air in again. This can be done as often and as quick as may be necessary. If too much air pressure goes into the tire, the nozzle 22 being still held on the tire valve, the back pressure of the air will force the tube 19 and bring the valve 20 against the finger 30. Air will then escape until the pressure on the tube 19 lets this tube recede so that the valve 20 will close automatically.

The springs 18 may or may not be attached to the partitions 5 and 7 and the gauge 9.

What I claim, is,—

1. A combined filling and testing device for inflating pneumatic tires comprising a casing provided with a partition at its receiving end and a partition near the discharge end and passages through said partitions, said casing having a longitudinal slot in one side and a scale adjacent to said slot and having a rack in the interior of the other side, a perforated-spring-actuated gauge movable in said casing to be spaced nearer to or further from said partitions to be determined by the quantity of pressure required, elastic tubes attached to said gauge and to said partitions constituting the passage for air between said partitions, said gauge being held in position by said rack, a flexible testing tube in said passage at said discharge end attached to the partition and provided with a valve, and a lug carried by said gauge adapted to open said valve for testing purposes.

2. A combined filling and testing device for inflating pneumatic tires comprising a casing having a receiving nozzle and a discharge nozzle, a partition near the receiving nozzle and a partition near the discharge nozzle both perforated for passage of air, a perforated movable gauge adapted to occupy a variety of positions between said partitions, elastic tubes attached to said partitions and to said gauge, means for holding said gauge at different points in said casing, an inlet valve for said receiving nozzle normally open and a relief valve normally closed and operatively connected with said inlet valve whereby one opens when the other is closed and vice versa, and means for permitting excess pressure to escape consisting of a flexible tube attached to the partition at the discharge end and surrounding the air passage and a valve carried by said tube, and a lug carried by said gauge adapted to open said valve.

3. A combined filling and testing device for inflating pneumatic tires comprising a casing having a receiving nozzle and a discharge nozzle, a partition near the receiving nozzle and a partition near said discharge nozzle, a gauge mounted in said casing between said partitions, rubber tubes attached to said partitions and to said gauge and said partitions and gauge having openings therethrough for completing an air passage through said casing, springs for re-inforcing said tubes, an elastic tube within the rubber tube at the discharge end and attached to the adjacent partition, a relief valve carried by said elastic tube, and a lug carried by said gauge for automatically opening said relief valve for permitting excessive air pressure to escape from the vehicle tube which is being filled.

In testimony whereof, I set my hand this 14th day of May, 1923.

JONAS E. MAPLES.